United States Patent
Hirayama et al.

(10) Patent No.: US 10,495,721 B2
(45) Date of Patent: Dec. 3, 2019

(54) COMMUNICATION DEVICE, COMMUNICATION TERMINAL DEVICE, COMMUNICATION METHOD, AND NON-TRANSITORY TANGIBLE COMPUTER READABLE MEDIUM

(71) Applicant: DENSO CORPORATION, Kariya, Aichi-pref. (JP)

(72) Inventors: Yasuhiro Hirayama, Kariya (JP); Satoshi Yoshinaga, Kariya (JP); Yukihito Ikami, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/900,931

(22) Filed: Feb. 21, 2018

(65) Prior Publication Data

US 2018/0246185 A1  Aug. 30, 2018

(30) Foreign Application Priority Data

Feb. 24, 2017 (JP) .................................. 2017-33198
Dec. 28, 2017 (JP) ................................ 2017-253275

(51) Int. Cl.
*H04W 4/40* (2018.01)
*G01S 5/00* (2006.01)
(Continued)

(52) U.S. Cl.
CPC ............ *G01S 5/0072* (2013.01); *G01S 19/49* (2013.01); *H04W 4/44* (2018.02); *H04W 4/027* (2013.01); *H04W 4/40* (2018.02)

(58) Field of Classification Search
CPC ....... H04L 47/25; H04L 47/26; H04L 47/126; H04L 47/10; H04L 47/507;
(Continued)

(56) References Cited

U.S. PATENT DOCUMENTS

2008/0037577 A1  2/2008  Nagura
2010/0312432 A1*  12/2010  Hamada ................. G08G 1/163
  701/31.4
(Continued)

FOREIGN PATENT DOCUMENTS

JP  2006-165806 A  6/2006
JP  2010-288141 A  12/2010
(Continued)

OTHER PUBLICATIONS

"*Specification of Cooperative Awareness Basic Service*", ETSI EN 302 637-2 V1.3.2 (Nov. 2014).

*Primary Examiner* — Charles N Appiah
*Assistant Examiner* — Xiang Zhang
(74) *Attorney, Agent, or Firm* — Harness, Dickey & Pierce, P.L.C.

(57) ABSTRACT

A communication device includes: a receiving unit that receives first peripheral device data, which relates to a movement state of a first peripheral device, and second peripheral device data, which relates to a movement state of a second peripheral device; an acquiring unit that acquires host device data which relates to a movement state of a host device; a control unit that calculates host device collision prediction time between the first peripheral device and the host device and other device collision prediction time between the first peripheral device and the second peripheral device, and shortens a transmission interval of the host device data when the host device collision prediction time is shorter than a predetermined value and the host device collision prediction time is shorter than the other device collision prediction time; and a transmission unit that transmits the host device data according to the transmission interval.

12 Claims, 11 Drawing Sheets

(51) Int. Cl.
*G01S 19/49* (2010.01)
*H04W 4/44* (2018.01)
*H04W 4/02* (2018.01)

(58) Field of Classification Search
CPC .. H04L 12/1489; H04W 28/02; H04W 28/06; H04W 28/0273; H04W 36/22; H04W 72/12; H04W 74/0816; H04W 74/0825; H04W 74/0841; H04W 74/0858; H04W 4/40; H04W 4/027
See application file for complete search history.

(56) References Cited

U.S. PATENT DOCUMENTS

| | | | |
|---|---|---|---|
| 2011/0019577 A1 | 1/2011 | Nagura | |
| 2014/0004894 A1 | 1/2014 | Yamamoto | |
| 2016/0037462 A1 | 2/2016 | Yamamoto | |
| 2016/0347310 A1* | 12/2016 | Moran | B60W 30/09 |

FOREIGN PATENT DOCUMENTS

| | | | |
|---|---|---|---|
| JP | 4770635 B2 | 9/2011 | |
| JP | 5069346 B2 | 11/2012 | |
| WO | WO-2012/124685 A1 | 9/2012 | |

\* cited by examiner

COMMUNICATION DEVICE, COMMUNICATION TERMINAL DEVICE, COMMUNICATION METHOD, AND NON-TRANSITORY TANGIBLE COMPUTER READABLE MEDIUM

CROSS REFERENCE TO RELATED APPLICATIONS

This application is based on Japanese Patent Applications No. 2017-33198 filed on Feb. 24, 2017, and No. 2017-253275 filed on Dec. 28, 2017, the disclosures of which are incorporated herein by reference.

TECHNICAL FIELD

The present disclosure relates to a communication device or a communication terminal device which is mainly used for communication between vehicles or between a pedestrian and a vehicle.

BACKGROUND

In order to smoothly and safely realize movement or logistics, it is extremely important to ensure road traffic safety. In recent years, in order to prevent traffic accidents or the like, technological development or rule making for sophistication of safe driving support system have become active.

The safe driving support systems generally prevent accidents in advance by mutually communicating various pieces of information including positional information with automobiles, pedestrians, and road facilities. In the communication of the safe driving support system, a carrier sense multiple access/collision avoidance (CSMA/CA) system which is capable of controlling transmission timing in a decentralized manner without synchronization of each communication device is widely adopted.

However, in the CSMA/CA system, when there are many devices which try to perform communication, there is a problem that a plurality of devices transmits information at the same time such that information collision occurs and the success rate of communication decreases. In particular, when the success rate of communication in the safe driving support system decreases, information cannot be densely exchanged between vehicles and between pedestrians and the vehicle, and this is against the goal of preventing accidents. Here, in a communication device, congestion control is performed when congestion of a communication channel is detected, and congestion of communication channels is mitigated by, for example, lowering the transmission frequency of information, and thus, collision of information is prevented.

However, when the transmission frequency is merely lowered with respect to the increase in traffic volume, the timing at which positional information of other vehicles can be acquired is delayed, and there is a concern that driving support is not possible at an appropriate timing. In particular, when the vehicle is moving at high speed, or when sudden acceleration or sudden deceleration is performed, if the acquisition timing of the positional information is delayed, there is a problem that the error from the actual position of the vehicle becomes large. In order to solve the problem, there is a technology for adjusting the following transmission frequency in accordance with the change in traveling speed and behavior of the vehicle.

However, according to the technologies described in Patent Literature 1 and Non Patent Literature 1, in order to adjust the transmission frequency in accordance with the traveling state of the host vehicle, when the host vehicle is stopped or travels at a constant speed at low speed, there is a possibility that the timing at which the other approaching vehicle acquires the positional information of the host vehicle is delayed.

In addition, Patent Literature 2 and Patent Literature 3 adjust the transmission frequency in accordance with the traveling speed of the host vehicle and other vehicles, but when supporting a collision prevention against traffic congestion, in Patent Literature 2, since the speed difference between vehicles in the traffic congestion is small, the transmission frequency is lowered.

In addition, Patent Literature 3 is designed to immediately transmit information when there is a speed difference from the approaching vehicle. However, in this method, since congestion recurs when a large number of vehicles in traffic congestion detects an approaching vehicle, the information is transmitted in accordance with the transmission probability that corresponds to the number of vehicles at the end of the traffic congestion. However, when the transmission is performed according to the transmission probability, for example, there remains a possibility that a vehicle having a high risk which is positioned at the end does not transmit the positional information, and there is a concern that driving support cannot be performed at an appropriate timing with respect to the approaching vehicle.

In addition, when performing the detection only from the viewpoint of whether or not the vehicle is at the end of the traffic congestion, as disclosed in Patent Literature 3, for example, when a vehicle is stopped on the shoulder while the traffic lane is congested, since the stopped vehicle is not at the end and the transmission frequency is still low, there is a case where the discovery of such a vehicle is delayed. Otherwise, in situations other than traffic congestion, for example, when a straight traveling vehicle approaches a vehicle which waits to turn to the right at an intersection, or when a plurality of vehicles enter from different directions at an intersection, there is no concept about the end, and thus, it is difficult to respond to the situation.

[Patent Literature 1] JP-2006-165806-A
[Patent Literature 2] WO 2012/124685-A1
[Patent Literature 3] JP-2010-288141-A
[Non Patent Literature 1] ETSI EN302 637-2 V1.3.2

SUMMARY

It is an object of the present disclosure to provide a communication device and a communication terminal device which are capable of performing driving support at appropriate timings with respect to vehicles and the like having various traveling states or positional relationships.

According to a first aspect of the present disclosure, a communication device includes: a receiving unit that receives first peripheral device data, which relates to a movement state of a first peripheral device and is transmitted from the first peripheral device, and second peripheral device data, which relates to a movement state of a second peripheral device and is transmitted from the second peripheral device; an acquiring unit that acquires host device data which relates to a movement state of a host device; a control unit that: calculates host device collision prediction time, which is predicted collision time between the first peripheral device and the host device, and other device collision prediction time, which is predicted collision time between the first peripheral device and the second peripheral device, according to the first peripheral device data, the second peripheral device data, and the host device data; and shortens a transmission interval of the host device data when the host device collision prediction time is shorter than a predetermined value and the host device collision prediction time is shorter than the other device collision prediction time; and a transmission unit that transmits the host device data according to the transmission interval.

According to the above-described communication device, driving support can be performed at appropriate timings with respect to a vehicle or the like having various traveling states or positional relationships.

According to a second aspect of the present disclosure, a communication terminal device includes: a receiving unit that receives first peripheral device data, which relates to a movement state of a first peripheral device, transmitted from the first peripheral device and second peripheral device data, which relates to a movement state of a second peripheral device, transmitted from the second peripheral device; an acquiring unit that acquires host device data which relates to a movement state of the host device; a control unit that: calculates host device collision prediction time, which is predicted collision time between the first peripheral device and the host device, and other device collision prediction time, which is predicted collision time between the first peripheral device and the second peripheral device, according to the first peripheral device data, the second peripheral device data, and the host device data; and shortens a transmission interval of the host device data when the host device collision prediction time is shorter than a predetermined value and the host device collision prediction time is shorter than the other device collision prediction time; a transmission unit that transmits the host device data according to the transmission interval; and an antenna that is connected to the receiving unit and the transmission unit.

According to the above-described communication terminal device, driving support can be performed at appropriate timings with respect to a vehicle or the like having various traveling states or positional relationships.

According to a third aspect of the present disclosure, a communication method includes: receiving first peripheral device data, which relates to a movement state of a first peripheral device, transmitted from the first peripheral device and second peripheral device data, which relates to a movement state of a second peripheral device, transmitted from the second peripheral device; acquiring host device data which relates to a movement state of the host device; calculating host device collision prediction time, which is predicted collision time between the first peripheral device and the host device, and other device collision prediction time, which is predicted collision time between the first peripheral device and the second peripheral device, according to the first peripheral device data, the second peripheral device data, and the host device data; shortening a transmission interval of the host device data when the host device collision prediction time is shorter than a predetermined value and the host device collision prediction time is shorter than the other device collision prediction time; and transmitting the host device data according to the transmission interval.

According to the above-described communication method, driving support can be performed at appropriate timings with respect to a vehicle or the like having various traveling states or positional relationships.

According to a fourth aspect of the present disclosure, a non-transitory tangible computer readable medium comprises instructions for execution by a computer, the instructions includes: receiving first peripheral device data, which relates to a movement state of a first peripheral device, transmitted from the first peripheral device and second peripheral device data, which relates to a movement state of a second peripheral device, transmitted from the second peripheral device; acquiring host device data which relates to a movement state of the host device; calculating host device collision prediction time, which is predicted collision time between the first peripheral device and the host device, and other device collision prediction time, which is predicted collision time between the first peripheral device and the second peripheral device, according to the first peripheral device data, the second peripheral device data, and the host device data; shortening a transmission interval of the host device data when the host device collision prediction time is shorter than a predetermined value and the host device collision prediction time is shorter than the other device collision prediction time; and transmitting the host device data according to the transmission interval.

According to the above-described non-transitory tangible computer readable medium, driving support can be performed at appropriate timings with respect to a vehicle or the like having various traveling states or positional relationships.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
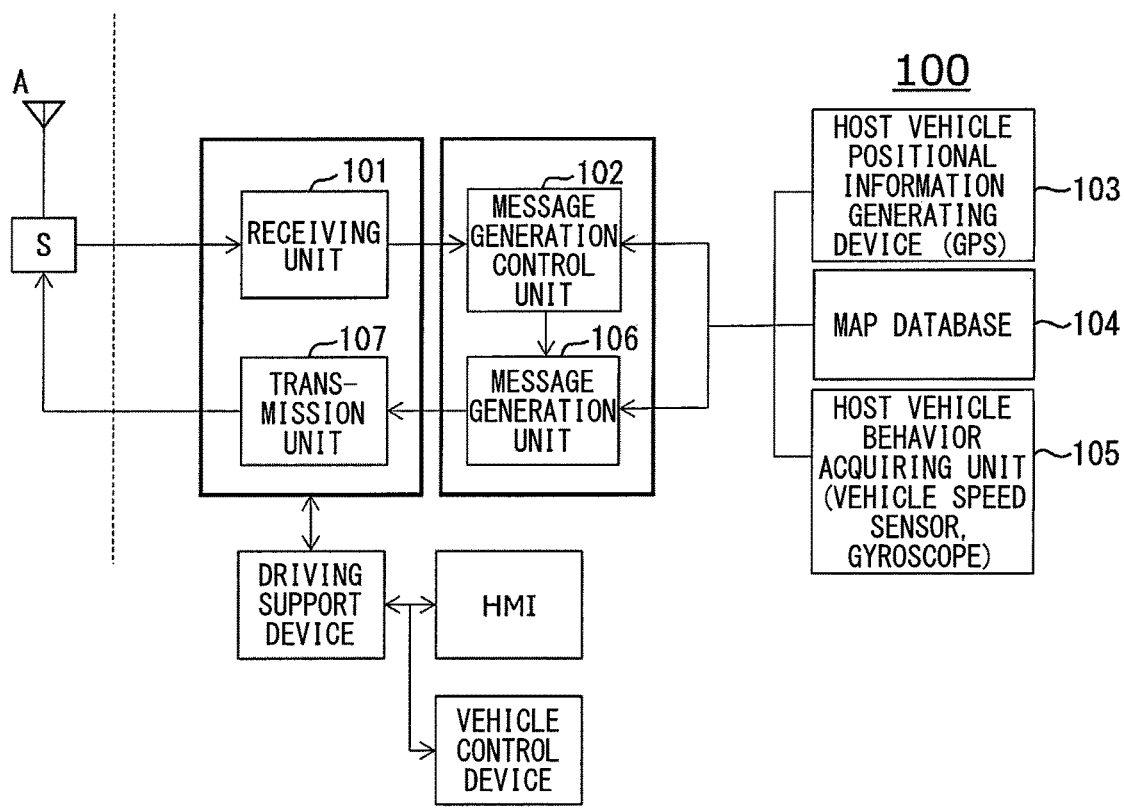
FIG. 1 is a block diagram describing a configuration of a communication device according to the present disclosure.

The configurations disclosed in each of the embodiments are not limited to only each of the embodiments, but can be combined over the embodiments.

Configuration Common to Each Embodiment

First, the configuration of a communication device of the present disclosure will be described with reference to FIG. 1 as a configuration common to each of the embodiments of the present disclosure.

A communication device 100 which is "host device" of the present disclosure, is mounted on the host vehicle or possessed by a pedestrian himself or herself, and transmits and receives data related to "movement state" as a message with another communication device which is also a "peripheral device" that is also mounted on peripheral vehicles or possessed by pedestrians in the vicinity thereof. In the present embodiment, an example of on-vehicle device mounted on a vehicle (host vehicle, peripheral vehicle) together with the host device and the peripheral device will be described.

Here, "host device" of the present disclosure refers to the communication device of the present disclosure. "Peripheral device" refers to a communication device which exists within a communication distance range of the host device. "Movement state" also includes not only a state in which the host device or the peripheral device are moving but also a state in which the host device is stationary.

The communication device 100 includes a receiving unit 101, a message generation control unit 102, a message generation unit 106, and a transmission unit 107. In addition, the communication device 100 is connected to a host vehicle positional information generating device 103, a map database 104, and a host vehicle behavior acquiring unit 105.

The receiving unit 101 receives a message having information on the position, the speed, and the advancing direction (hereinafter referred to as the positional information or the like) of the peripheral vehicle which is "peripheral device data" from the peripheral vehicle via an antenna A as a packet.

Here, "peripheral device data" of the present disclosure refers to data related to "movement state" of a peripheral device that has transmitted a signal to the host device, and includes, for example, data, such as the position, speed, and advancing direction of the peripheral device.

Meanwhile, a GPS which is the host vehicle positional information generating device 103 detects the positional information of the host vehicle which is "host device data", and a vehicle speed sensor and a gyroscope which serve as the host vehicle behavior acquiring unit 105 respectively and similarly detect the speed and the advancing direction of the host vehicle which is "host device data". The detected "host device data" is acquired by the message generation control unit 102 which will be described later. The message generation control unit 102 corresponds to "acquiring unit" of the present disclosure.

Here, "host device data" of the present disclosure refers to data related to "movement state" of the host device, and includes, for example, data such as the position, speed and advancing direction of the host device.

The map database 104 holds road map information and outputs road map information as necessary.

The road map information output from the map database 104, such as the positional information of the peripheral vehicle received by the receiving unit 101 or positional information detected by the host vehicle positional information generating device 103 and the host vehicle behavior acquiring unit 105, is used in controlling the host vehicle in a vehicle control device via a driving support device of the host vehicle, and is provided as audio-visual information to a driver from a display device, such as a car navigation system or the like as an human-machine interface (HMI) or a sound reproduction device.

The message generation control unit 102 calculates "predicted collision time" (TTC: Time To Collision) between the peripheral vehicle and the host vehicle from the positional information of the peripheral vehicles and the like received by the receiving unit 101 and the positional information of the host vehicle detected by the host vehicle positional information generating device 103 and the host vehicle behavior acquiring unit 105.

Here, "predicted collision time" of the present disclosure refers to, for example, the predicted time at which the host device and the peripheral device or the peripheral devices are expected to collide with each other.

In addition, the message generation control unit 102 outputs a control signal for controlling "transmission interval", such as the positional information of the host vehicle to the message generation unit 106. Specifically, based on comparison of the predicted collision time between the peripheral vehicle and the host vehicle with a "predetermined value", the message generation control unit 102 outputs the control signal so as to shorten the transmission interval of the positional information or the like of the host vehicle with respect to the message generation unit 106 when the predicted collision time between the peripheral vehicle and the host vehicle is "less" than the predetermined value. In other cases, for example, the control signal based on a known congestion control method, is output.

Here, "transmission interval" of the present disclosure need not necessarily be constant, and may be proportionally shortened or may be random, for example. "Predetermined value" may be a value uniquely determined when a condition is given, and does not necessarily have to be constant at all times. "More" or "less" includes both cases including and not including the same value as the comparison target.

The message generation control unit 102 further performs computation, processing and the like described in each embodiment.

Based on the transmission interval instructed by the control signal output from the message generation control unit 102, the message generation unit 106 outputs the positional information of the host vehicle and the like detected by the host vehicle positional information generating device 103 and the host vehicle behavior acquiring unit 105 to the transmission unit 107 that serves as a message.

In addition, the message generation control unit 102 and the message generation unit 106 collectively correspond to "control unit" of the present disclosure.

The transmission unit 107 transmits a message including the positional information of the host vehicle and the like output from the message generation unit 106 to the peripheral vehicles from an antenna A as a packet.

Next, the configuration of a specific control unit will be described from the viewpoint of operation in each of the embodiments.

First Embodiment

Based on First Embodiment, the basic operation of the communication device of the present disclosure will be described with reference to FIGS. 2 and 3. First Embodiment is a basic operation which is a common premise of Second Embodiment and the following embodiments thereof.

Figure 2:
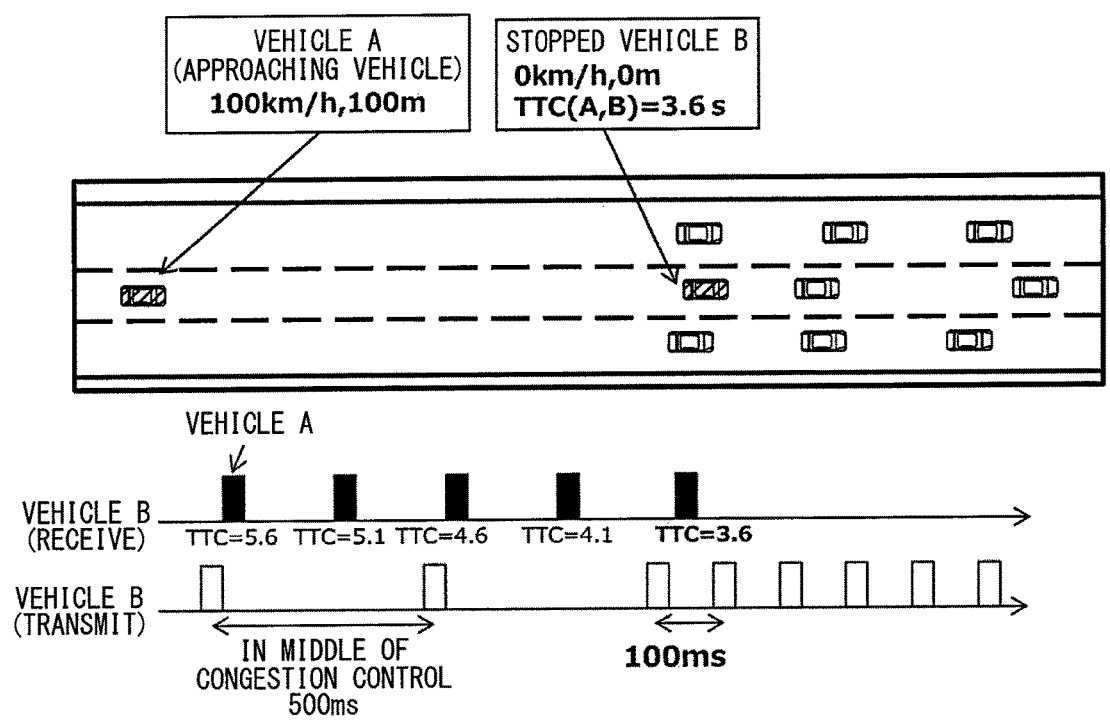
FIG. 2 is an explanatory view for describing control contents in First Embodiment of the communication device of the present disclosure.

The upper part of FIG. 2 is a view illustrating a relationship between the position and the speed of a vehicle A mounted with the communication device which is "peripheral device" at a certain point of time and a vehicle B mounted with the communication device which is "host device". The vehicle B is positioned at the end of the traffic congestion and is stopped. The vehicle A travels at a speed of 100 km per hour to a position of 100 m from the vehicle B and is approaching the vehicle B. Both of the vehicle A and the vehicle B are mounted with the communication device illustrated in FIG. 1. In the present embodiment, attention is paid to the vehicle B first.

The lower part of FIG. 2 is a view illustrating a packet received by the vehicle B and a packet transmitted by the vehicle B at a certain continuous time. The vehicle B has received the packet transmitted by the vehicle A. In addition, the vehicle B is under congestion control and transmits positional information and the like as a packet at a certain transmission interval (500 ms in FIG. 2). The vehicle B uses the positional information included in the packet transmitted by the vehicle A and the positional information of the vehicle B itself in the message generation control unit 102 to calculate the predicted collision time with the vehicle A every time a packet is received. Specifically, the predicted collision time can be obtained by dividing the relative distance by the relative speed. For example, in FIG. 2, in accordance with the approaching of the vehicle A, the predicted collision time gradually decreases to become (5.6 s), (5.1 s), (4.6 s), (4.1 s), and (3.6 s). In addition, at the point of time when the value becomes equal to or less than a preset predetermined value, for example, 4 seconds or less in the present embodiment, the message generation control unit 102 of the vehicle B outputs a control signal of which the contents are an instruction to shorten the packet transmission interval to the message generation unit 106. The message generation unit 106 of the vehicle B which has received the control signal outputs the packet transmission interval to the transmission unit 107 as 100 ms that is less than 500 ms, and the transmission unit 107 transmits the packet at the transmission interval of 100 ms.

Figure 3:
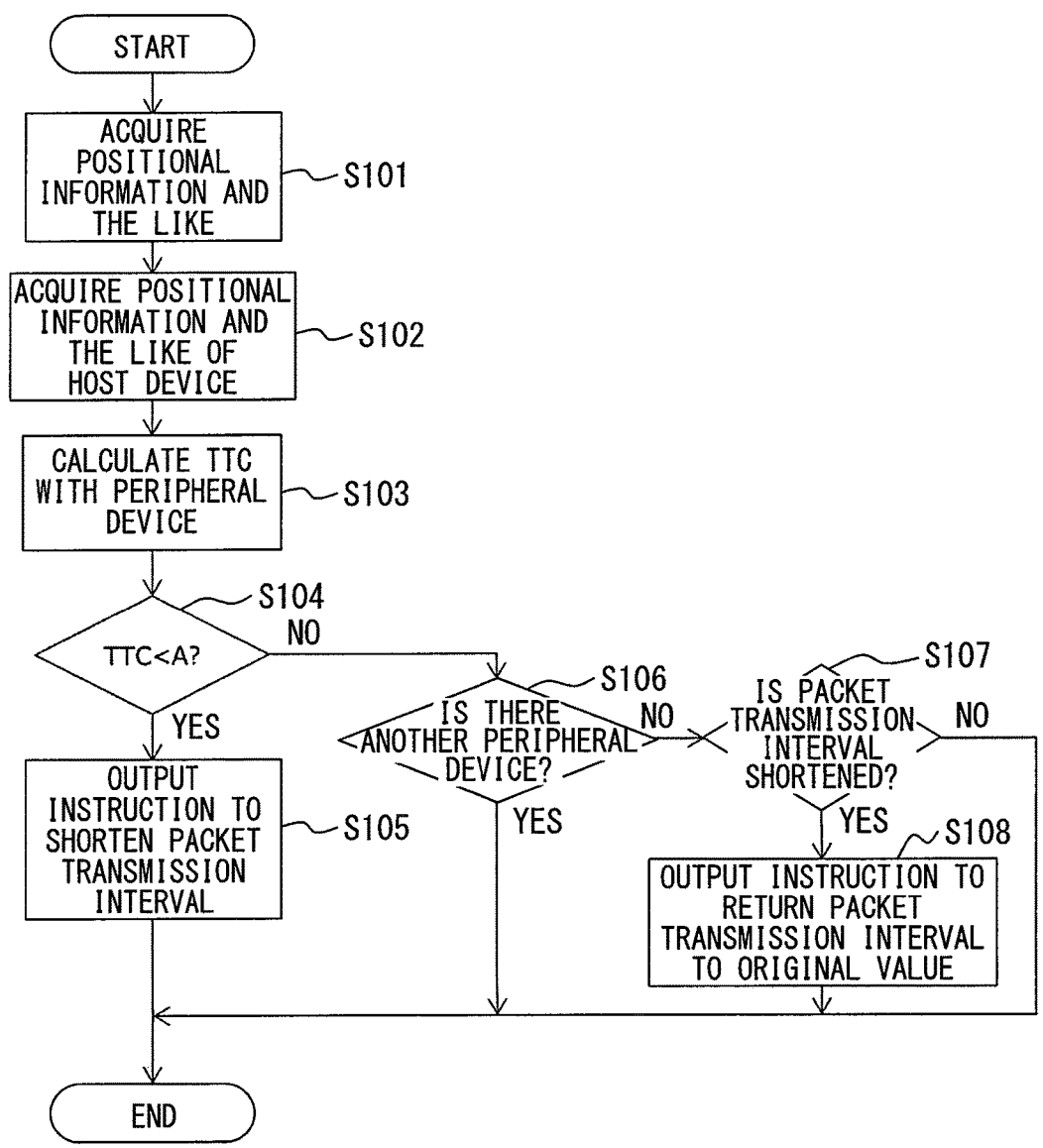
FIG. 3 is a flow chart for describing operations in First Embodiment of the communication device of the present disclosure.

FIG. 3 is a flow chart for describing operations of the communication device 100 of First Embodiment of the present disclosure. Here, the processing in the communication device 100 (host device) of the vehicle B that serves as the host vehicle will be described.

In addition, although the terms "equal to or greater than" and "equal to or less than" in the description of all of the following flowcharts including FIG. 3 are described as meaning not including the target of comparison as described in the flowchart, instead of these, any or both of "equal to or greater than" or "equal to or less than" can be changed or interpreted to include the target of comparison.

First, the receiving unit 101 receives and acquires a message having positional information and the like from a peripheral device mounted on the vehicle A which is a peripheral vehicle, as a packet (S101).

Next, the message generation control unit 102 acquires the positional information of the host vehicle detected by the GPS which is the host vehicle positional information generating device 103 of the communication device 100, and the speed and advancing direction of the host vehicle which are detected by the vehicle speed sensor and the gyroscope that are host vehicle behavior acquiring unit 105 (S102).

In addition, the message generation control unit 102 calculates a predicted collision time (referred to as TTC in the drawing) between the peripheral vehicle and the host vehicle from the positional information of the peripheral vehicle and the positional information of the host vehicle (S103).

When the predicted collision time between the peripheral vehicle and the host vehicle is equal to or less than the predetermined value (A in the drawing) (S104: Y), the control signal for shortening the transmission interval of the positional information and the like of the host vehicle is output to the message generation unit 106 (S105).

When the predicted collision time between the peripheral vehicle and the host vehicle is equal to or greater than the predetermined value (S104: N), when there is not another peripheral device which has received the packet until the previous time and the predicted collision time is determined to be less than the predetermined value (S106: N), it is determined whether or not the transmission interval of the positional information or the like of the host vehicle is shortened (S107), and when the transmission interval is shortened (S107: Y), the control signal for restoring the transmission interval of the positional information or the like of the host vehicle to an original value, is output to the message generation unit 106 (S108). When the transmission interval is not shortened (S107: N), the transmission interval is not changed. In addition, when there is another peripheral device of which the predicted collision time is determined to be equal to or less than the predetermined value (S106: Y), the transmission interval is not changed.

The above-described processing is executed each time the packet is received from the peripheral device of the peripheral vehicle. In addition, the output of the control signal for shortening the packet transmission interval (S105) may be performed each time the packet is received, but after performing the processing of shortening the transmission interval, the execution of S105 may be omitted. Further, as long as certain processing is not a prerequisite for the next processing, the order of the processing in FIG. 3 can be appropriately replaced. Hereinafter, the same is applied to any of the embodiments.

Accordingly, the vehicle A can recognize the existence of the stopped vehicle B at an early stage, and can perform driving support at a more appropriate timing. For example, the vehicle A automatically performs braking to perform control for deceleration, and at the same time, a warning that there is a risk of collision with a vehicle in front of the vehicle with a screen and voice of the car navigation system can be made.

In addition, in the present embodiment, attention has been paid to the vehicle B that is stopped, but the same control may also be performed with respect to the vehicle A. In other words, on the vehicle A side, by using the positional information included in the packet transmitted by the vehicle B and the positional information of the vehicle A itself, the predicted collision time is calculated every time a packet is received. In addition, when the predicted collision time is 4 seconds or less which is a preset predetermined value, the vehicle A sets the packet transmission interval to 100 ms that is less than 500 ms.

Accordingly, the vehicle B can recognize the existence of the vehicle A that is approaching rapidly at an early stage, and can perform driving support at a more appropriate timing. For example, the vehicle B can warn that the vehicle is approaching from behind and there is a risk of collision with the screen and voice of the car navigation system.

In the embodiment, "transmission interval" of the packet is constantly fixed to 100 ms, but the transmission interval may be determined in accordance with the predicted collision time or the speed or position of the vehicle A and the vehicle B. A plurality of values may be selected in accordance with the situation, for example, when a risk is generated, the transmission interval is set to be 150 ms, and when the risk is coming close, the transmission interval is set to be 100 ms.

In addition, the transmission interval may be changed continuously to be less in accordance with the degree of risk.

Furthermore, the transmission may be performed once immediately after determining to shorten the transmission interval.

After determining to shorten the transmission interval, a random waiting time may be provided. Accordingly, when the plurality of vehicles determined to shorten the transmission interval substantially at the same time, collision of packets can be prevented.

In the present embodiment, the transmission interval is ms, that is, the time is a unit, but other units may also be used. For example, the transmission interval may be specified by a frequency (Hz), the number of slots, or the like.

The transmission interval may be read as transmission frequency, transmission timing, or transmission cycle and is technologically synonymous.

This is also applied to the other embodiments described below.

In addition, in the present embodiment, "predetermined value" is set to 4 seconds, but the numerical value and unit may be appropriately changed in accordance with the distance or speed of the peripheral vehicles.

This is also applied to the other embodiments described below.

Although the predicted collision time is used in the present embodiment, instead of this, the decrease amount per unit time of the predicted collision time may be used and the transmission interval may be shortened when the predicted collision time is greater than the predetermined value. For a vehicle which approaches at a higher speed than the normally assumed speed range, driving support can be provided at a more appropriate timing than using the predicted collision time.

This is also applied to the other embodiments described below.

Figure 4:
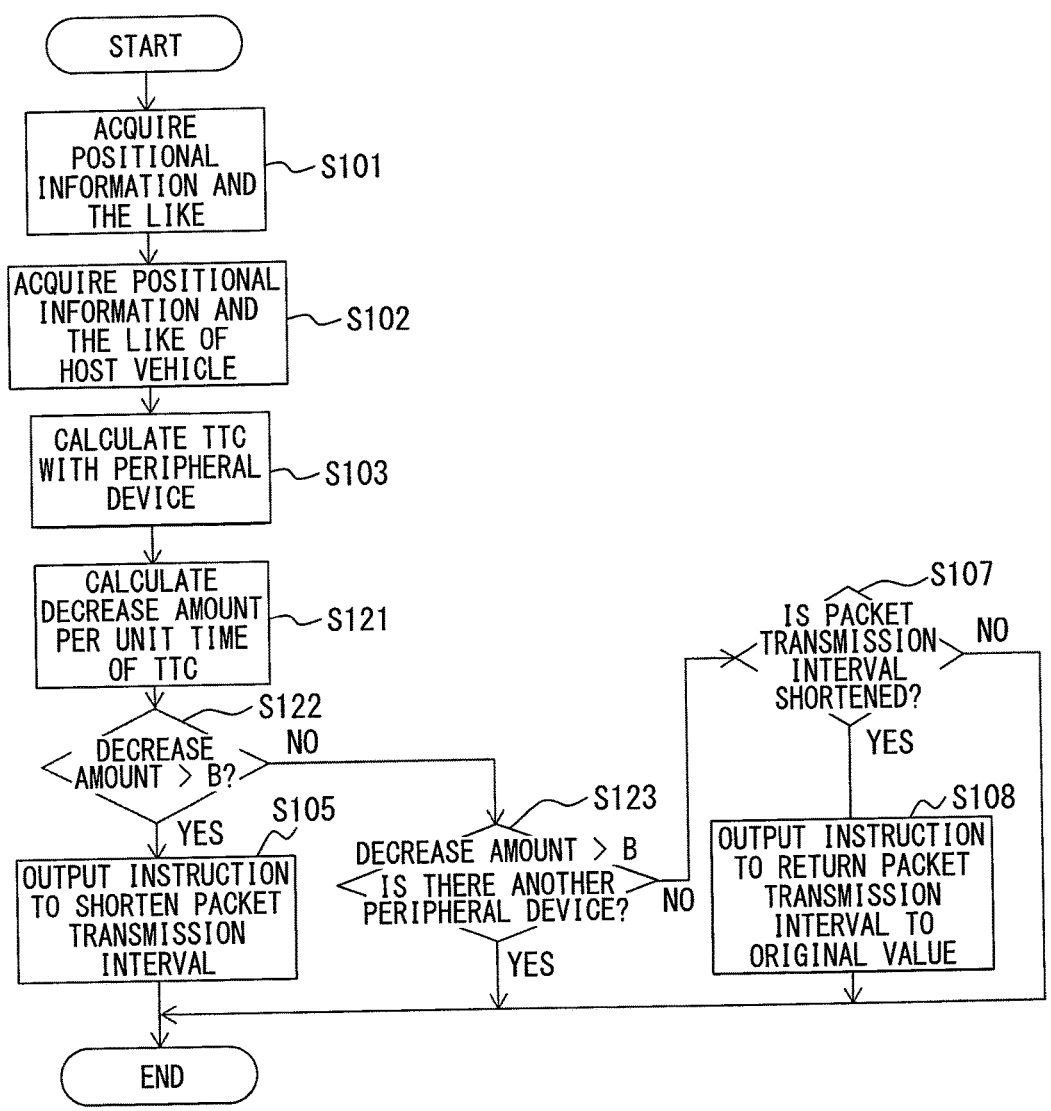
FIG. 4 is a flow chart for describing operations in First Embodiment of the communication device of the present disclosure.

FIG. 4 is a flow chart for describing operations of the communication device 100 in this case. Processing similar to that in FIG. 3 will be given the same step numbers, and the description thereof will be omitted.

After calculating the predicted collision time in S103, the decrease amount per unit time of the predicted collision time is calculated (S121). When the decrease amount is equal to or greater than a predetermined value (indicated by B in the drawing) (S122: Y), a control signal for shortening the transmission interval of the positional information or the like of the host vehicle, is output (S105).

When the decrease amount is equal to or less than the predetermined value (S122: N), when there is no other peripheral devices which have received the packet until the previous time and the decrease amount is determined to be equal to or greater than the predetermined value (S123: N), it is determined whether or not the transmission interval of the positional information of the host vehicle is shortened (S107), and when the transmission interval is shortened (S107: Y), the control signal for returning the transmission interval of the positional information of the host vehicle to the original value is also output (S108). When the transmission interval is not shortened (S107: N), the transmission interval is not changed. In addition, when there is another peripheral device of which the predicted collision time is determined to be equal to or greater than the predetermined value (S123: Y), the transmission interval is not changed.

In the present embodiment, the vehicle B may add a flag indicating that the positional information and the like of the vehicle A which is "peripheral device data", has been acquired from the vehicle A on which the communication device which is "peripheral device" is mounted, to the packet to be transmitted, and may be transmitted. A method of using this flag will be described in Fourth Embodiment.

Second Embodiment

Based on Second Embodiment, the operation of the communication device of the present disclosure will be described with reference to FIGS. 5 and 6. In the present embodiment, processing for more effectively suppressing reoccurrence of congestion is performed.

Figure 5:
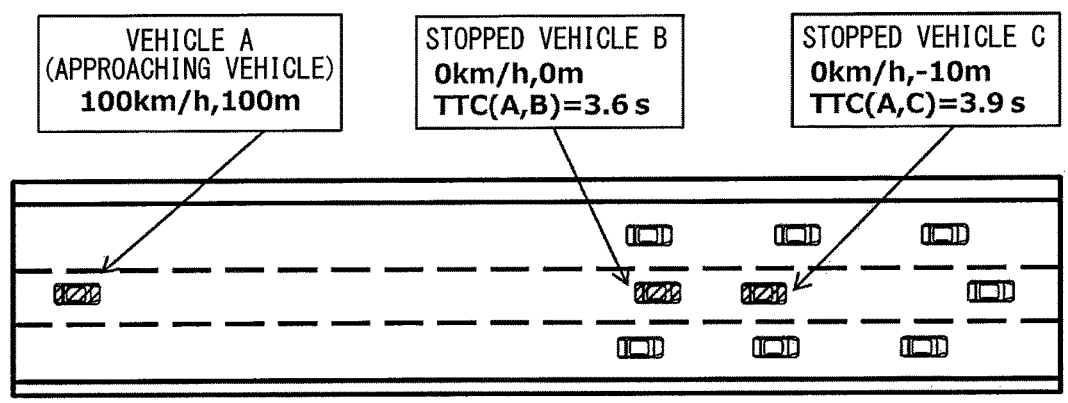
FIG. 5 is an explanatory view for describing control contents in Second Embodiment of the communication device of the present disclosure.
Figure 5:
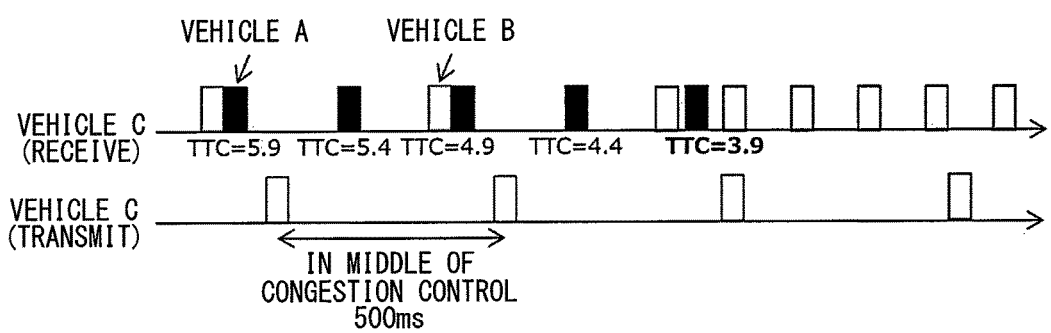

The upper part of FIG. 5 is a view illustrating a position relationship between the vehicle A mounted with the communication device which is "first peripheral device" at a certain point of time, the vehicle B mounted with the communication device which is "second peripheral device", and a vehicle C mounted with the communication device which is "host device". The relationship between the position and speed of the vehicle A and the vehicle B is similar to those in First Embodiment. The vehicle C stops at a position of 10 m at a front part of the vehicle B in the advancing direction. The vehicle C is also mounted with the communication device illustrated in FIG. 1. The vehicle A is approaching the vehicle B and the vehicle C. In the present embodiment, attention is paid to the vehicle C.

The lower part of FIG. 5 is a view illustrating a packet received by the vehicle C and a packet transmitted by the vehicle C at a certain continuous time. The vehicle C has received the packet transmitted by the vehicle A and the vehicle B. In addition, the vehicle B and the vehicle C are under congestion control and transmit the positional information and the like as a packet at a certain transmission interval (500 ms in FIG. 5). The vehicle C uses the positional information included in the packet transmitted by the vehicle A and the positional information of the vehicle C itself in the message generation control unit 102 to calculate the predicted collision time (corresponds to "host device predicted collision time" of the present disclosure) with the vehicle A every time a packet is received. For example, in FIG. 5, in accordance with the approaching of the vehicle A, the predicted collision time gradually decreases to become (5.9 s), (5.4 s), (4.9 s), (4.4 s), and (3.9 s).

At the same time, the vehicle C uses the positional information included in the packet transmitted by the vehicle A and the positional information included in the packet transmitted by the vehicle B, and the like in the message generation control unit 102 to calculate the predicted collision time (corresponds to "other device predicted collision time" of the present disclosure) until the vehicle A and the vehicle B collide with each other.

In addition, when the host device predicted collision time is equal to or less than a preset predetermined value, for example, 4 seconds or less in the present embodiment, the host device predicted collision time and the other device predicted collision time are compared with each other. When the host device predicted collision time is smaller than the other device predicted collision time, the message generation control unit 102 of the vehicle C outputs the control signal of which the contents are an instruction to shorten the packet transmission interval to the message generation unit 106. The message generation unit 106 of the vehicle C which has received the control signal shortens the transmission interval of the packet of the positional information or the like. When the host device predicted collision time is greater than the other device predicted collision time, the transmission interval of packets of positional information or the like is not changed. For example, in FIG. 5, since the host device predicted collision time is 3.9 seconds and the other device predicted collision time is 3.6 seconds, the vehicle C does not change the packet transmission interval. (Meanwhile, since the host device collision time (3.6 second s) is smaller than the other device predicted collision time (3.9 second s) when being viewed from the vehicle B, the vehicle B shortens the packet transmission interval.)

Figure 6:
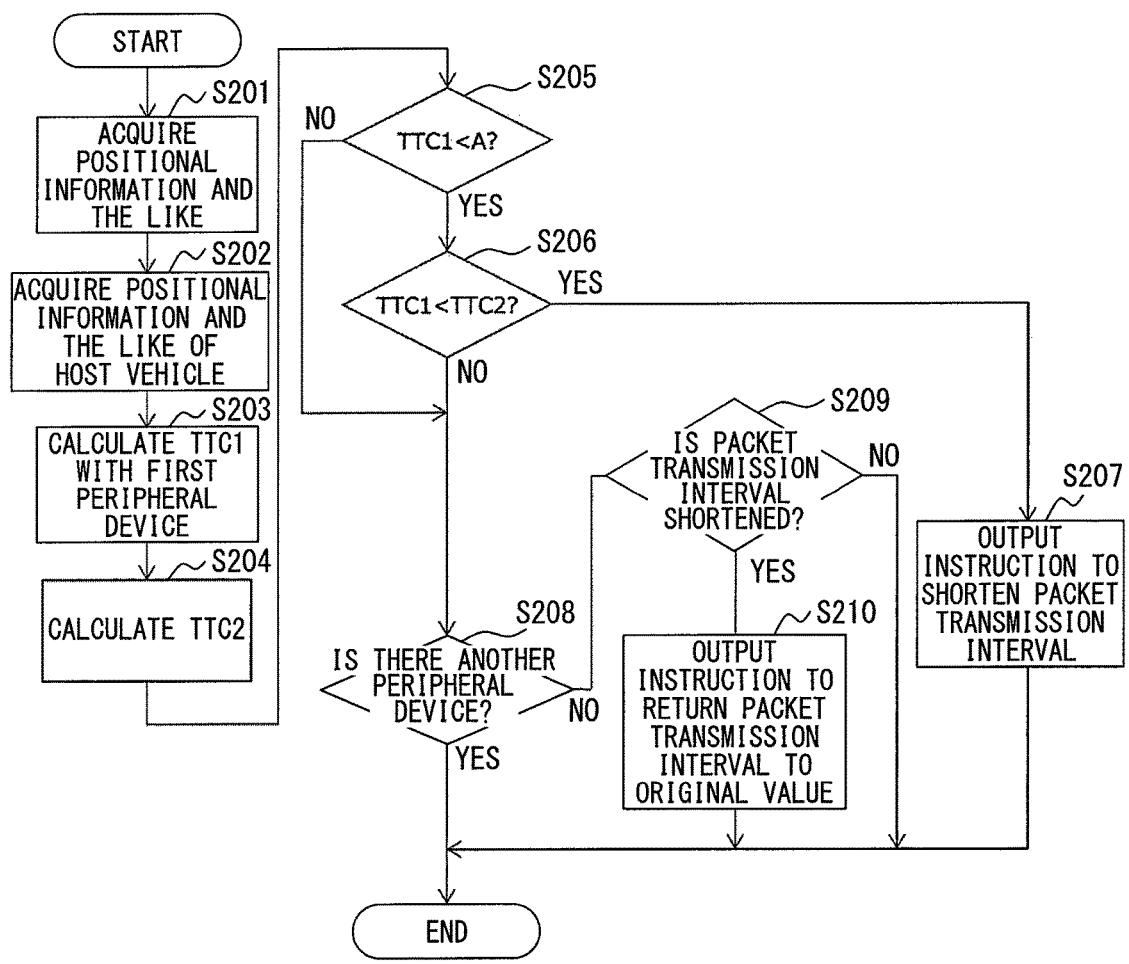
FIG. 6 is a flow chart for describing operations in Second Embodiment of the communication device of the present disclosure.

FIG. 6 is a flow chart for describing operations of the communication device 100 of Second Embodiment of the present disclosure. Here, the processing in the communication device 100 (host device) of the vehicle C that serves as the host vehicle will be described.

First, the receiving unit 101 receives and acquires a message having positional information and the like from the first and second peripheral devices mounted on the vehicle A and the vehicle B which are peripheral vehicles, as a packet (S201).

Next, the message generation control unit 102 acquires the positional information of the host vehicle detected by the GPS which is the host vehicle positional information generating device 103 of the communication device 100, and the speed and advancing direction of the host vehicle which are detected by the vehicle speed sensor and the gyroscope that are host vehicle behavior acquiring unit 105 (S202).

In addition, the message generation control unit 102 uses the positional information and the like included in the packet transmitted by the first peripheral device of the vehicle A and the positional information and the like of the vehicle C itself to calculate the host device predicted collision time with the vehicle A every time a packet is received (referred to as TTC1 in the drawing) (S203).

Furthermore, the message generation control unit 102 uses the positional information and the like included in the packet transmitted by the first peripheral device of the vehicle A and the positional information and the like included in the packet transmitted by the second peripheral device of the vehicle B to calculate the other device predicted collision time (referred to as "TTC2" in the drawing) until the vehicle A and the vehicle B collide with each other. In other words, the TTC2 between the second peripheral device and the first peripheral device which have received the information in the past is calculated (S204).

It is determined whether or not the host device predicted collision time is equal to or less than a preset predetermined value (indicated by A in the drawing) (S205). When the host device predicted collision time is equal to or greater than the predetermined value (S205: N), the process proceeds to S208, and when the host device predicted collision time is equal to or less than the predetermined value (S205: Y), the host device predicted collision time and the other device predicted collision time are compared with each other (S206). When the host device predicted collision time is equal to or less than the other device predicted collision time (S206: Y), the message generation control unit 102 of the vehicle C outputs the control signal of which the contents are an instruction to shorten the packet transmission interval to the message generation unit 106 (S207).

When the host device predicted collision time is equal to or greater than the other device predicted collision time (S206: N), it is determined whether or not there is another peripheral device of which the packet is received until the previous time, the host device predicted collision time is equal to or less than the predetermined value, and the host device predicted collision time is determined to be equal to or less than the other device predicted collision time (S208). When the condition is satisfied (S208: Y), the processing is terminated. When the condition is not satisfied (S208: N), it is determined whether or not the transmission interval of the positional information and the like of the host vehicle is shortened (S209), and when the transmission interval is shortened (S209: Y), the control signal for restoring the transmission interval of the positional information and the like of the host vehicle is output to the message generation unit 106 from the message generation control unit 102 (S210). When the transmission interval is not shortened (S209: N), the transmission interval is not changed.

In addition, in the above-described example, the host device predicted collision time and the other device predicted collision time are compared with each other (S206) after comparing the host device predicted collision time with a predetermined value (S205). But this order may be reversed. In this case, processing for narrowing down the peripheral vehicles to be compared is performed first.

As described above, since the vehicle C does not change the packet transmission interval, the increase in congestion caused by the vehicle near the end of the traffic congestion can be reduced. In other words, the vehicle of which the packet transmission interval is shortened can be kept in the vicinity of the end of the traffic congestion. As a result, the vehicle A can recognize the existence of the stopped vehicle B at an early stage, and can perform driving support at a more appropriate timing.

It is needless to say that the present embodiment can be applied not only to the end of traffic congestion but also to various situations. For example, when there is a stopped vehicle on a road shoulder while the traffic lane is congested, when a straight traveling vehicle approaches a vehicle which waits to turn to the right at an intersection, or a case where a plurality of vehicles enter from different directions at an intersection can also be handled. An example of a case of turning right at an intersection will be described in Fifth Embodiment which will be described later.

In addition, the vehicle B mounted with the communication device which is "second peripheral device" referred to by the vehicle C may be limited to the one positioned in "within the predetermined distance range" from the vehicle C. An example thereof will be described in Fifth Embodiment which will be described later.

Here, "within the predetermined distance range" of the present disclosure may be a distance range which is uniquely determined when a condition is given, and does not necessarily have to be constant range at all times. In addition, a case of being expressed in time instead of distance, is also included.

In the present embodiment, the vehicle C and the vehicle B may add a flag indicating that the positional information and the like of the vehicle A which is "first peripheral device data", has been acquired from the vehicle A on which the communication device which is "first peripheral device" is mounted, to the packet to be transmitted, and may be transmitted. A method of using this flag will be described in Fourth Embodiment.

Modification Example of Second Embodiment

In Second Embodiment, the second peripheral device is not particularly narrowed down, or the second peripheral device is employed being limited to a device positioned within a predetermined distance range.

Moreover, in a case of FIG. 5, there may be a situation in which the transmission interval of packets of positional information or the like is not shortened due to some causes, for example, that the vehicle B has not received the packet from the vehicle A. In this case, neither the vehicle B nor the vehicle C performs the processing of shortening the transmission interval, and there is a concern that the early recognition of the vehicle B and the vehicle C when viewed from the vehicle A fails. Hereinafter, a modification example of Second Embodiment will be described with reference to FIGS. 1 and 7. In the present embodiment, attention is also paid to the vehicle C.

In FIG. 1, when the message generation control unit 102 of the communication device 100 outputs a control signal to shorten the transmission interval of packets, such as the positional information of the host vehicle to the message generation unit 106, information (for example, a flag) indicating that the transmission interval is shortened is included in "host device data" and transmitted from the message generation unit 106.

In addition, the message generation control unit 102 obtains the other device predicted collision time only for "second peripheral device" that has transmitted "peripheral device data" including information indicating that the transmission interval is shortened.

Figure 7:
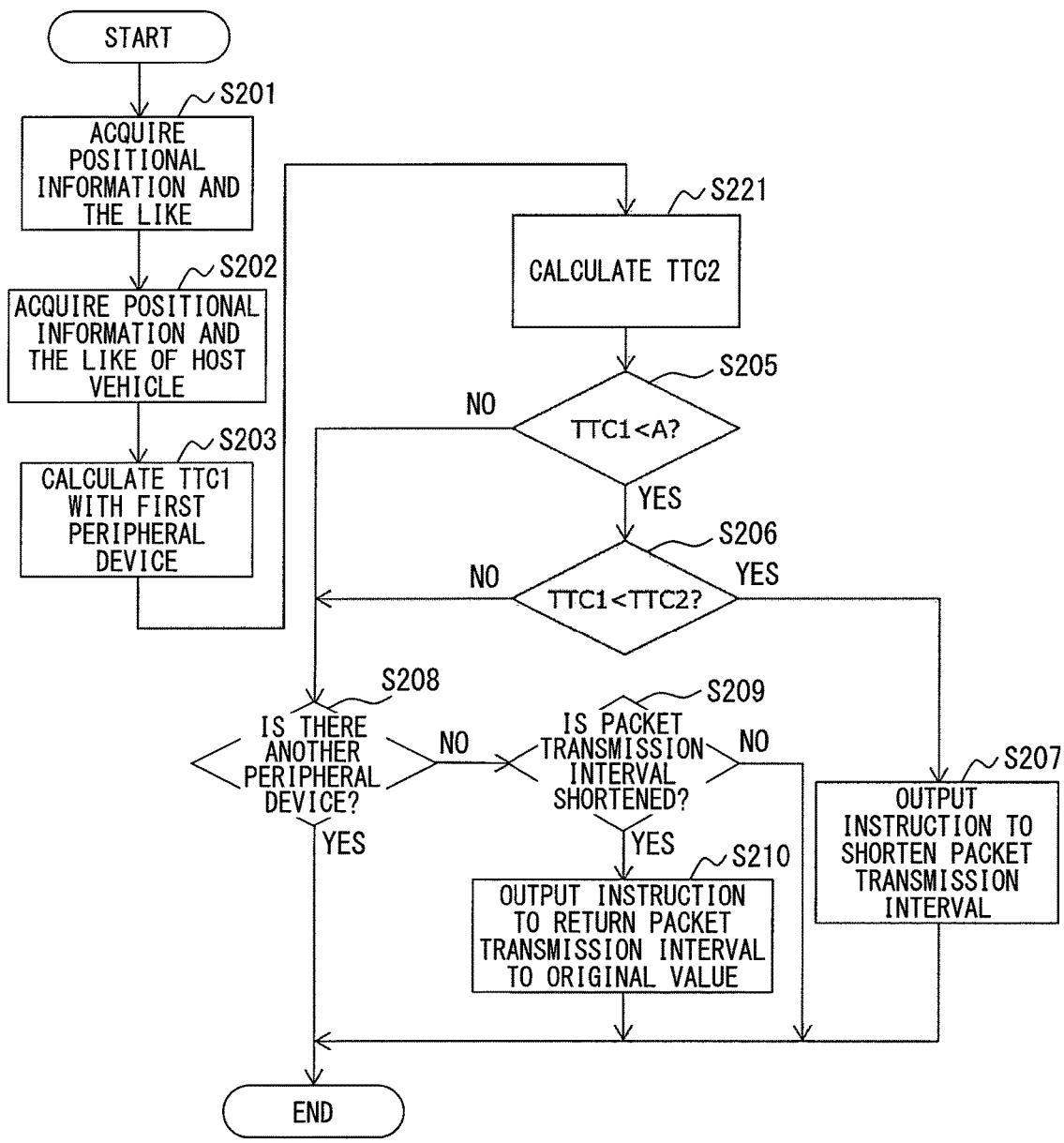
FIG. 7 is a flow chart for describing operations in a modification example of Second Embodiment of the communication device of the present disclosure.

FIG. 7 is a flow chart for describing operations of the communication device 100 of a modification example of Second Embodiment of the present disclosure. Here, the processing in the communication device 100 (host device) of the vehicle C that serves as the host vehicle will be described. Processing similar to that in FIG. 6 will be given the same step numbers, and the description thereof will be omitted.

In FIG. 6 illustrating Second Embodiment, the message generation control unit 102 uses the positional information and the like included in the packet transmitted by the first peripheral device of the vehicle A and the positional information and the like included in the packet transmitted by the second peripheral device of the vehicle B to calculate the other device predicted collision time (referred to as "TTC2" in the drawing) until the vehicle A and the vehicle B collide with each other (S204). In FIG. 7 illustrating a modification example of Second Embodiment, instead of S204, only the second peripheral device that has received the information (F information) indicating that the transmission interval has been shortened is considered as a target for calculating the other device predicted collision time. In other words, the TTC2 between the second peripheral device and the first peripheral device which have received the packets including F information in the past is calculated (S221). The following processing is the same as that in FIG. 6.

According to the configuration, for example, in a case of the first example, since information indicating that the transmission interval has been shortened is not included in the peripheral device data transmitted from the vehicle B (S221), the vehicle C does not consider the vehicle B as a target for obtaining the other device predicted collision time. As a result, the vehicle C shortens the transmission interval of the host device data using only the host device predicted collision time, and the vehicle A can recognize the vehicle C at an early stage.

Third Embodiment

Based on Third Embodiment, the operation of the communication device of the present disclosure will be described with reference to FIG. 8.

Although First Embodiment and Second Embodiment are processing when a packet from the vehicle A can be received, when a packet from the vehicle A cannot be received, it is necessary to perform another processing. In the present embodiment, attention is paid to the vehicle B.

Figure 8:
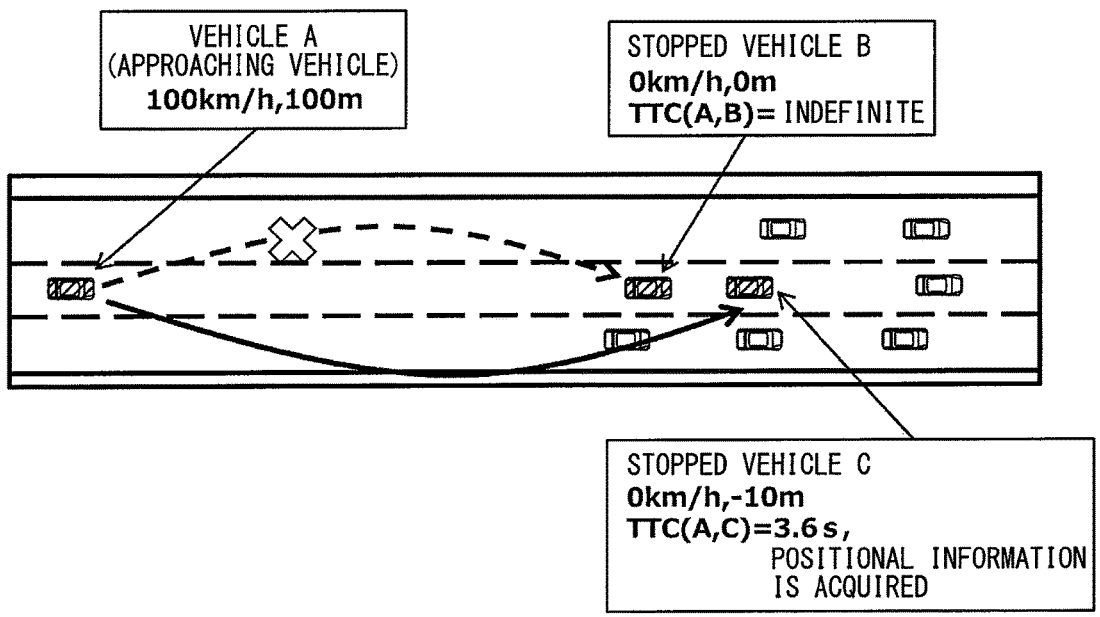
FIG. 8 is an explanatory view for describing control contents in Third Embodiment of the communication device of the present disclosure.

FIG. 8 is a view illustrating a position relationship between the vehicle A mounted with the communication device which is "first peripheral device" at a certain point of time, the vehicle C mounted with the communication device which is "second peripheral device", and the vehicle B mounted with the communication device which is "host device". The relationship between the position and speed of the vehicle A, the vehicle B, and the vehicle C is similar to those in First Embodiment and Second Embodiment. However, since the vehicle B has not received the packet from the vehicle A, the predicted collision time with the vehicle A (corresponds to "host device predicted collision time" of the present disclosure) cannot be obtained. Meanwhile, the vehicle C shortens the packet transmission interval based on First Embodiment or Fourth Embodiment which will be described later, or due to the influence of congestion control.

In such a case, when it is detected that the vehicle C mounted with the communication device which is "second peripheral device" shortens the packet transmission interval instead of the control of First Embodiment or Second Embodiment, the message generation control unit 102 of the vehicle B outputs a control signal of which the contents are an instruction to shorten the packet transmission interval to the message generation unit 106, and the message generation unit 106 of the vehicle B sets the packet transmission interval to be 100 ms that is less than 500 ms.

Here, the determination as to whether or not the packet transmission interval is shortened can be performed from the comparison with the transmission interval that was received in the past, a difference from the transmission interval estimated from the positional information of the vehicle C, and a difference from the transmission interval at the time of congestion control estimated from the number of peripheral vehicles. In addition, when adopting the configuration of the modification example of Second Embodiment, whether or not information indicating that the transmission interval is shortened is included in the received peripheral device data can be determined.

Accordingly, even when there is a communication error, the certainty that the vehicle A can recognize the existence of the stopped vehicle B can be increased, and the driving support control can be performed at a more appropriate timing.

In addition, in First Embodiment and Second Embodiment, it is mentioned that a flag indicating that the positional information has been acquired may be added to the packet to be transmitted. However, in a case of the vehicle B of the present embodiment, since the positional information and the like from the vehicle A are not acquired, the flag is not transmitted. A method of using this flag will be described in Fourth Embodiment.

Fourth Embodiment

Based on Fourth Embodiment, the operation of the communication device of the present disclosure will be described with reference to FIG. 9.

In Third Embodiment, the operation when the vehicle B cannot receive the packet from the vehicle A has been described. However, when the packet transmission interval has been shortened when the packet from the vehicle A thereafter has been received, congestion mainly occurs in the vehicle B.

Here, in the present embodiment, when the vehicle B can receive a packet from the vehicle A, the vehicle B again determines whether to shorten the packet transmission interval according to the contents of First Embodiment or Second Embodiment.

However, in a case of the processing according to the contents of Second Embodiment, the vehicle mounted with the communication device which is "second peripheral device" for obtaining "other device predicted collision time" to be compared may be limited to a vehicle which acquires the positional information and the like of the vehicle A. In FIG. 9, the vehicle C has acquired the positional information and the like of the vehicle A, includes the flag indicating that the positional information and the like of the vehicle A has been acquired in the packet, and transmits the packet. Meanwhile, a vehicle D has not acquired the positional information and the like of the vehicle A, does not include the flag indicating that the positional information and the like of the vehicle A has been acquired in the packet, and transmits the packet. In addition, the message generation control unit 102 of the vehicle B obtains the other device predicted collision time, and compares the host device predicted collision time only with respect to the vehicle (vehicle C in a case of FIG. 9) including the flag in the packet including the positional information and the like which has been received by the receiving unit 101.

Figure 9:
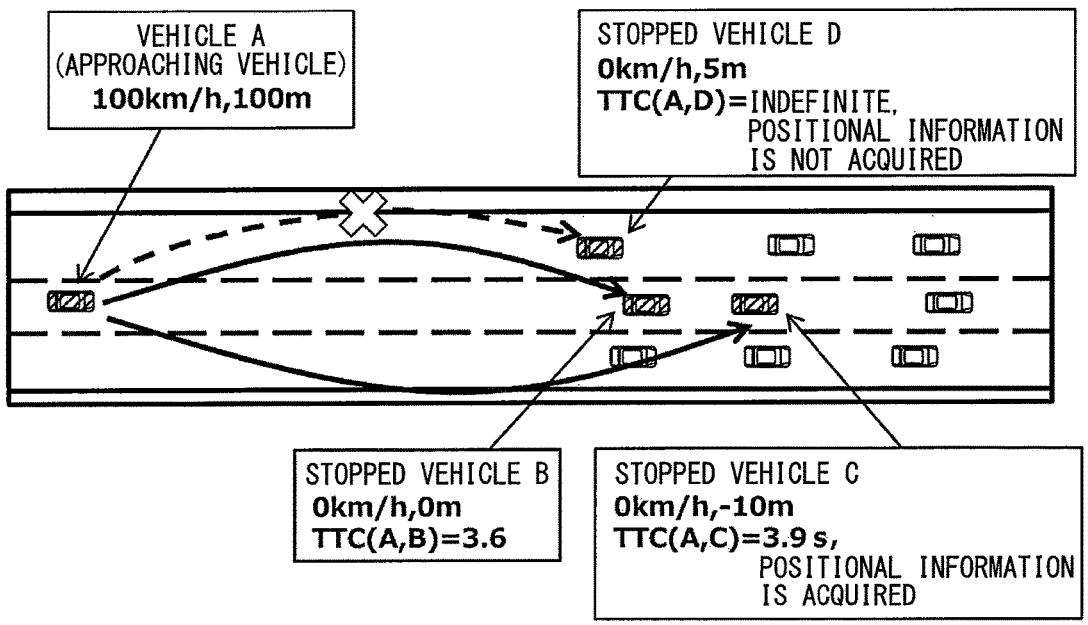
FIG. 9 is an explanatory view for describing control contents in Fourth Embodiment of the communication device of the present disclosure.
Figure 10:
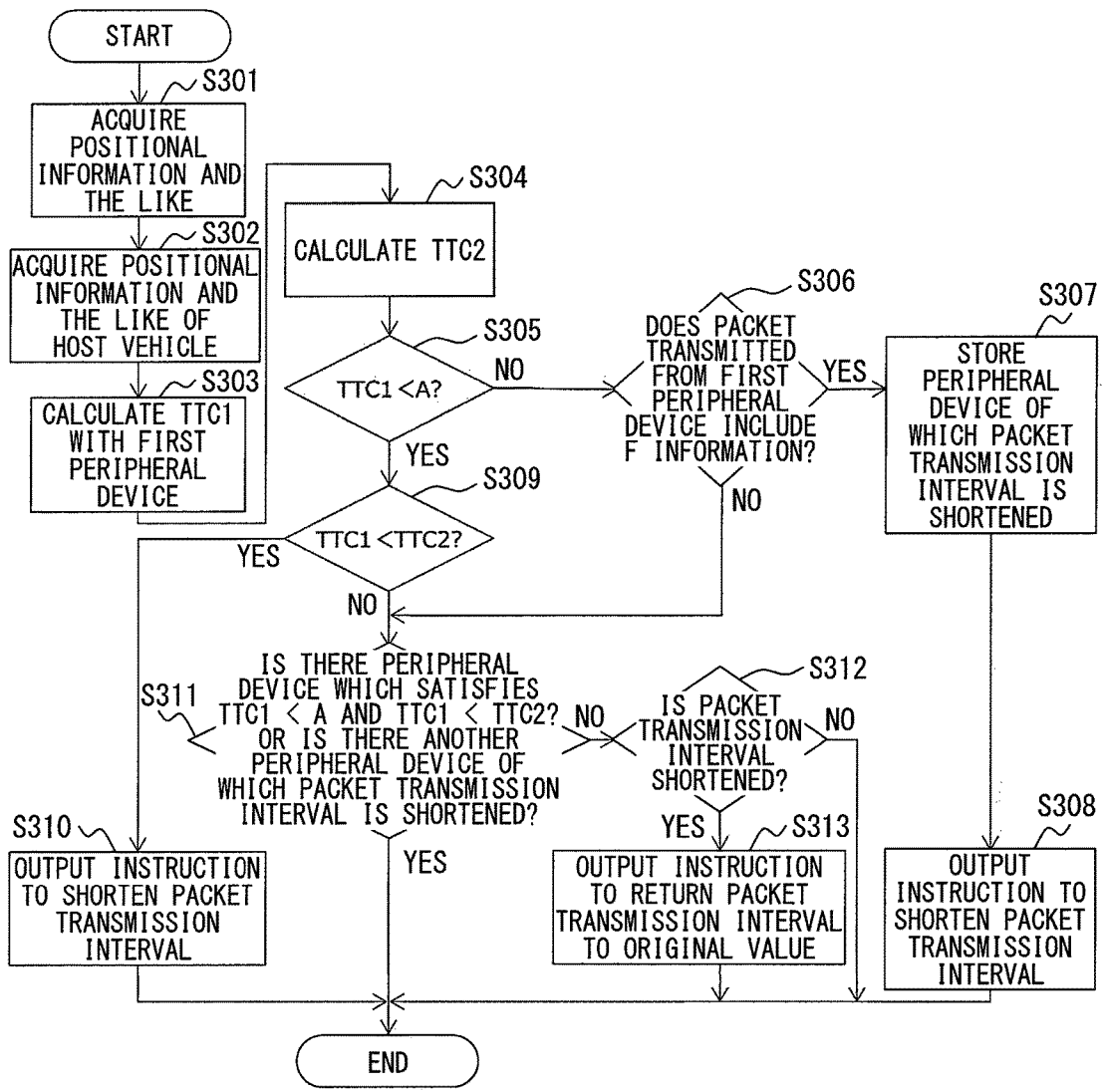
FIG. 10 is a flow chart for describing operations in Third and Fourth Embodiments of the communication device of the present disclosure.

FIG. 10 is a flow chart for describing operations of the communication device 100 of Third Embodiment and Fourth Embodiment of the present disclosure. Here, the processing in the communication device 100 (host device) of the vehicle B will be described. In other words, the operation of the communication device 100 in the vehicle B when the vehicle B initially has not received the packet from the vehicle A (FIG. 8), and then, the vehicle B is capable of receiving the packet from the vehicle A (FIG. 9), is assumed. In addition, in a case of FIG. 8, the vehicle C transmits a flag indicating that positional information and the like from the vehicle A have been acquired. In addition, in a case of FIG. 9, while the vehicle C transmits the flag indicating that the positional information and the like from the vehicle A has been acquired, the vehicle D does not transmit the flag indicating that the positional information and the like from the vehicle A has been acquired. In addition, in a case of FIG. 8 and in a case of FIG. 9, the vehicle C transmits the information indicating that the transmission interval has been shortened.

First, the flowchart of FIG. 10 will be described from a general viewpoint of the host device.

The receiving unit 101 receives and acquires a message having positional information and the like from the first and second peripheral devices, as a packet. In other words, the positional information and the like of the first and second peripheral devices are acquired from the received packet (S301).

The message generation control unit 102 acquires the positional information of the host vehicle detected by the GPS which is the host vehicle positional information generating device 103 of the communication device 100, and the speed and advancing direction of the host vehicle which are detected by the vehicle speed sensor and the gyroscope that are host vehicle behavior acquiring unit 105 (S302).

The message generation control unit 102 uses the positional information and the like included in the packet transmitted by the first peripheral device and the positional information and the like of the host device to calculate the host device predicted collision time with the first peripheral device every time a packet is received (referred to as TTC1 in the drawing) (S303).

The message generation control unit 102 uses the positional information and the like included in the packet transmitted by the first peripheral device, and the positional information and the like included in the packet transmitted by the second peripheral device that has received the information (F information) indicating that the transmission interval has been shortened and a flag (G information) indicating that the positional information from the first peripheral device is acquired in the past, to calculate the other device predicted collision time (referred to as "TTC2" in the drawing) until the first peripheral device and the second peripheral device collide with each other. In other words, the TTC2 between the second peripheral device and the first peripheral device which have received the packets including the G information and the F information in the past is calculated (S304).

In addition, it is determined whether or not the host device predicted collision time is equal to or less than a preset predetermined value (indicated by A in the drawing) (S305). When the host device predicted collision time is equal to or greater than the predetermined value (S305: N), it is determined whether or not the information (F information) indicating that the transmission interval has been shortened is included in the packet received from the first peripheral device (S306). When it is determined that the information is included in the packet (S306: Y), the peripheral device of which the packet transmission interval is shortened is stored (S307), and the message generation control unit 102 outputs the control signal for shortening the transmission interval of the positional information and the like of the host vehicle to the message generation unit 106 (S308). When it is determined that the information is not included in the packet (S306: N), the process proceeds to S311.

Meanwhile, when the host device predicted collision time is equal to or less than the preset predetermined value (A in the drawing) (S305: Y), the host device predicted collision time and the other device predicted collision time are compared with each other (S309). When the host device predicted collision time is equal to or less than the other device predicted collision time (S309: Y), the message generation control unit 102 outputs the control signal of which the contents are an instruction to shorten the packet transmission interval to the message generation unit 106 (S310). When the host device predicted collision time is equal to or greater than the other device predicted collision time (S309: N), it is determined whether or not there is the other peripheral device of which the packet is received until the previous time and the host device predicted collision time is determined to be equal to or less than the predetermined value and the host device predicted collision time is determined to be equal to or less than the other device predicted collision time, or there is another peripheral device of which the packet is received until the previous time and the packet transmission interval is determined as shortened (S311). When the condition is satisfied (S311: Y), the processing is terminated. When the condition is not satisfied (S311: N), it is determined whether or not the transmission interval of the positional information and the like of the host device is shortened (S312), and when the transmission interval is shortened (S312: Y), the control signal for restoring the transmission interval of the positional information and the like of the host vehicle is output to the message generation unit 106 from the message generation control unit 102 (S313). When the transmission interval is not shortened (S312: N), the transmission interval is not changed.

Next, processing in the vehicle B in a case of the situation in FIGS. 8 and 9 will be described with reference to the flowchart in FIG. 10.

First, the situation illustrated in FIG. 8 in which the vehicle B has not received the packets from the vehicle A, is assumed.

A message having the positional information and the like from the first and second peripheral devices mounted on the vehicle A and the vehicle C are received and acquired as a packet (S301). However, since a situation in which the packets from the vehicle A cannot be received is achieved, the communication device mounted on the vehicle C is recognized as the first peripheral device and only the packets from the vehicle C are acquired.

The positional information of the host vehicle and the speed and advancing direction of the host vehicle are acquired (S302).

The host device predicted collision time with the vehicle C is calculated (S303).

In addition, since the second peripheral device does not exist at this point of time, calculation of S304 is not performed.

Further, it is determined whether or not the host device predicted collision time is equal to or less than the preset predetermined value, but both the vehicle B and the vehicle C are also stopped, and thus, the host device predicted collision time becomes infinite and does not become equal to or less than the predetermined value (S305: N).

It is determined whether or not the packet received from the vehicle C includes the flag indicating that the positional information and the like from the vehicle A have been acquired (S306), and the packet received from the vehicle C includes the flag (S306: Y), the vehicle C of which the packet transmission interval is shortened is stored (S307), and an instruction to shorten the packet transmission interval is output (S308).

Next, the situation illustrated in FIG. 9 in which the vehicle B has received the packets from the vehicle A, is assumed.

A message having the positional information and the like from the first and second peripheral devices mounted on the vehicle A and the vehicle C is received and acquired as a packet (S301).

The positional information of the host vehicle and the speed and advancing direction of the host vehicle are acquired (S302).

The host device predicted collision time with the vehicle A is calculated (S303).

Since the packet received from the vehicle C includes the flag indicating that the positional information and the like from the vehicle A has been acquired and the information in which the packet transmission interval is shortened, the other device predicted collision time of the vehicle A and the vehicle C is calculated (S304). When the host device predicted collision time is equal to or less than the predetermined value (S305: Y), since the vehicle B is closer to the vehicle A than the vehicle C in the situation of FIG. 9, the host device predicted collision time is equal to or less than the other device predicted collision time (S309: Y). Therefore, the vehicle C performs the processing of shortening the packet transmission interval (S310). In addition, when the vehicle C is considered as the host device, the host device predicted collision time is equal to or greater than the other device predicted collision time (S309: N) in S309, and the processing in and after S311 is performed.

Accordingly, even when there is a communication error, as a result of being capable of preventing congestion from increasing, the certainty that the vehicle A can recognize the existence of the stopped vehicle B can be increased, and the driving support control can be performed at a more appropriate timing.

In this manner, when adopting the modification example of Second Embodiment, under the condition that the message generation control unit 102 of the vehicle B not only detects the flag indicating that the positional information and the like of the vehicle A has been acquired, but also extracts the information indicating that the transmission interval of the packet, such as positional information is shortened, only with respect to the vehicle which satisfies the condition, the other device predicted collision time is acquired and compared with the host device predicted collision time.

Fifth Embodiment

Based on Fifth Embodiment, the operation of the communication device of the present disclosure will be described with reference to FIG. 11.

In Second Embodiment, it is determined whether to change the packet transmission interval by referring to the predicted collision time between the peripheral vehicles (corresponds to "other device predicted collision time" of the present disclosure). However, in light of the purpose of suppressing the occurrence of congestion, it is unnecessary to consider the peripheral vehicles that are substantially separated from the host vehicle as a target. In addition, even when the peripheral vehicles are considered, there may be cases where the purpose of driving support at an appropriate timing is not achieved.

Figure 11:
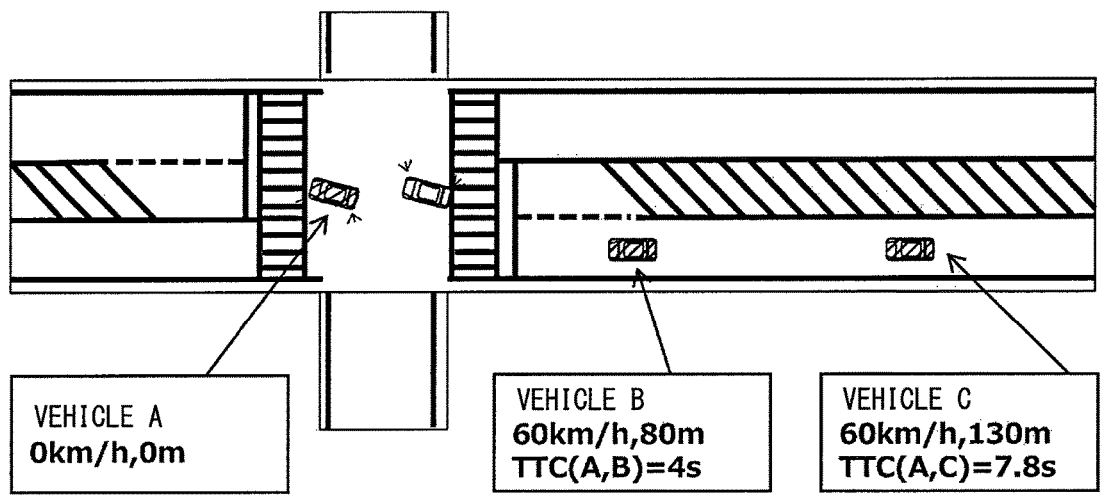
FIG. 11 is an explanatory view for describing control contents in Fifth Embodiment of the communication device of the present disclosure.

FIG. 11 is a view illustrating a position and speed relationship between the vehicle A mounted with the communication device which is "first peripheral device" at a certain point of time, the vehicle B mounted with the communication device which is "second peripheral device", and a vehicle C mounted with the communication device which is "host device". The vehicle A enters the intersection from the opposite lane and is waiting for a right turn. The vehicle B is at a distance of 80 m from the vehicle A and is going straight in the direction of the vehicle A at a speed of 60 km/h. The vehicle C is at a distance of 130 m from the vehicle A behind the vehicle B and is going straight in the direction of the vehicle A at a speed of 60 km/h. The vehicle A, the vehicle B, and the vehicle C are mounted with the communication device illustrated in FIG. 1. In the present embodiment, attention is paid to the vehicle C.

In this case, when the packet transmission interval transmitted by the vehicle C is controlled by the control method of Second Embodiment, the host device predicted collision time (7.8 s) of the vehicle C with respect to the vehicle A is greater than the other device predicted collision time (4 s) of the vehicle B with respect to the vehicle A. Therefore, the vehicle C advances without shortening the packet transmission interval. However, in this state, there is a possibility that the timing at which the vehicle A receives the packet of the vehicle C is delayed. For example, when the vehicle A starts turning right after the vehicle B passes through the intersection, the vehicle C becomes a dangerous vehicle. However, in this case, when the packet transmission interval of the vehicle C is long, the timing at which the vehicle A receives the packet of the vehicle C is delayed.

Here, in the present embodiment, the vehicle C determines whether or not the vehicle B is positioned within the predetermined distance range in the message generation control unit 102, and only when the vehicle C is positioned within the predetermined distance range, the processing of Second Embodiment is performed. The predetermined distance range may be a constant value or may be changed in accordance with the speed. The control is effective particularly when the speed of the host vehicle is equal to or higher than a certain speed.

Figure 12:
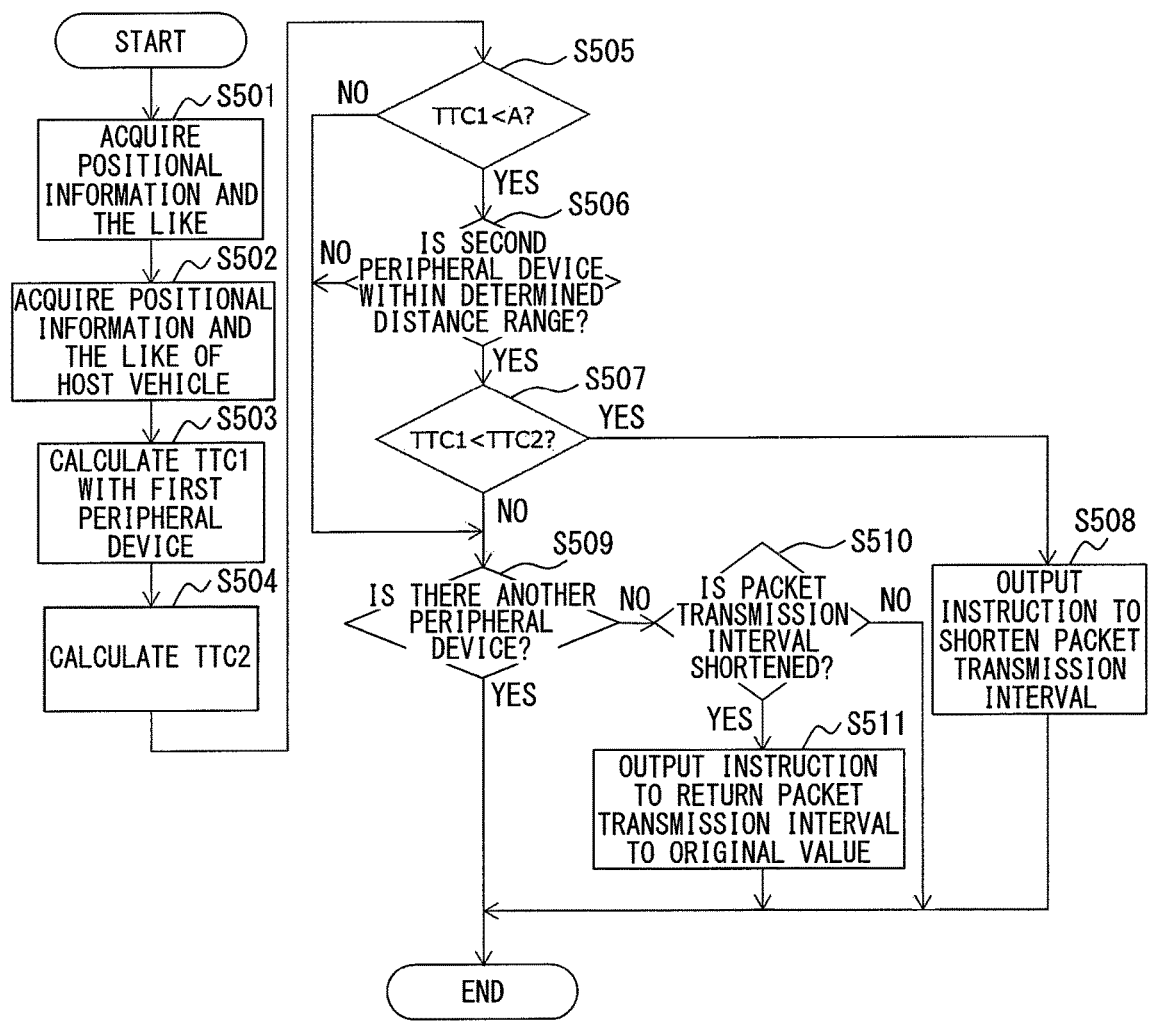
FIG. 12 is a flow chart for describing operations in Fifth Embodiment of the communication device of the present disclosure.

FIG. 12 is a flow chart for describing operations of the communication device 100 of Fifth Embodiment of the present disclosure. Here, the processing in the communication device 100 (host device) of the vehicle C that serves as the host vehicle will be described.

The flowchart illustrated in FIG. 12 is basically the same as the flowchart illustrated in FIG. 6 in Second Embodiment. S501 to S505 and S507 to S511 in FIG. 12 correspond to S201 to S205 and S206 to S210 of FIG. 6, respectively. The difference between the processes is that S506 is added in FIG. 12.

The message generation control unit 102 of the communication device 100 of the vehicle C determines whether or not the vehicle B which is the second peripheral device is positioned within the predetermined distance range (S506), and when the vehicle B is positioned within the predetermined distance range (S506: Y), processing in which the second peripheral device is considered is performed similar to Second Embodiment. When the vehicle B is not within the predetermined distance range (S506: N), processing in which the second peripheral device is not considered is performed.

Above, in the present embodiment, the purpose of prevention of congestion and the purpose of driving support at an appropriate timing can be harmonized.

Other Modification Examples of Each Embodiment

Each of the above-described embodiments may be appropriately modified as follows.

Based on the map data acquired from the map database 104 and the positional information acquired from the host vehicle positional information generating device 103, the target of which the predicted collision time is to be obtained is on a road on which the host vehicle is traveling or on a road connected thereto. Accordingly, whether to shorten the packet transmission interval can be more accurately determined.

When it is assumed that there is an error in positional information of another vehicle that can be acquired, the predicted collision time may be estimated to be smaller by the error. Accordingly, a situation in which an error occurs in the predicted collision time due to the influence of the error, and the packet cannot be transmitted at a necessary timing can be prevented.

Although the present embodiment has mainly been described as a case where a rear end collision occurs, the embodiment can also be applied to a right turn and straight travel case or a club head case as described in Fifth Embodiment.

In the present disclosure, in order to adjust the transmission interval of the host device data, the generation timing of packets in the message generation unit 106 is controlled, but packet generation is generated at regular time intervals, and the transmission timing in the transmission unit 107 may be controlled.

The present disclosure can be used in combination with the congestion control of the related art. When the transmission interval of the host device data is shortened by the method of the present disclosure, the control of the related art may be stopped, or the control start earlier among the results obtained by both of the cases may be selected.

(Summary)

The characteristics of the communication device according to the embodiment of the present disclosure have been described above.

In addition, in the above-described embodiment, a case where the communication device of the present disclosure is mounted on the vehicle, that is, the on-vehicle device has been described. However, the pedestrian possesses the communication device of the present disclosure, and the present disclosure may be applied to the communication device. In other words, the disclosure can be applied not only between the vehicles, but also between the pedestrian and the vehicle, and even between the pedestrians theoretically.

Further, in the above-described embodiments (for example, FIG. 1), a switch S for switching the transmission unit and the receiving unit of the communication device and the antenna A connected to the switch S are not included in the communication device, but may be considered as the communication terminal device by connecting the switch S and the antenna A to the communication device. Otherwise, instead of the switch S, different antennas A may be respectively connected for transmission and for reception. In addition to this, the communication terminal device may be provided with an amplifier or various types of filters. It is needless to say that the communication terminal device may be configured including at least one of the host vehicle positional information generating device (GPS), the map database, the host vehicle behavior acquiring unit (vehicle speed sensor, gyroscope), the driving support device, the vehicle control device, and the HMI.

Examples of the communication device that serves as an in-vehicle device include a semiconductor, an electronic circuit, a module, or an electronic control unit (ECU). In addition, examples of the communication terminal device include a car navigation system, a smartphone, a personal computer, and a portable information terminal, in addition to an ECU which is mounted on an automobile and connected to an antenna or the like.

Examples of the communication device possessed by the pedestrian include a smartphone, a personal computer, and a portable information terminal.

In addition, in each of the embodiments, the configuration of "control unit" has mainly been described from the viewpoint of the operations of the message generation control unit 102 and the message generation unit 106, but it is needless to say that each can be grasped as characteristics of the method. In other words, the present specification also discloses the present disclosure as a disclosure of the method.

Additionally, the present disclosure can be realized not only by the above-described dedicated hardware but also as a combination with a microcomputer having a program recorded in a recording medium, such as a memory or a hard disk, and a dedicated or general-purpose CPU and memory for executing the program. The program can also be provided from the server to the above-described dedicated hardware or microcomputer via a communication line without going through the recording medium. Accordingly, the latest functions can be always provided through program upgrading.

Although the communication device and the communication terminal device according to the present disclosure are mainly used for communication between the vehicles (inter-vehicle communication), and may be used for communication between the vehicle and the pedestrian (vehicle-pedestrian communication).

Furthermore, the present disclosure is not limited to the applications.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication device comprising:
a receiving unit that receives first peripheral device data, which relates to a movement state of a first peripheral device and is transmitted from the first peripheral device, and second peripheral device data, which relates to a movement state of a second peripheral device and is transmitted from the second peripheral device;
an acquiring unit that acquires host device data which relates to a movement state of a host device;
a control unit that:
calculates host device collision prediction time, which is predicted collision time between the first peripheral device and the host device, and other device collision prediction time, which is predicted collision time between the first peripheral device and the second peripheral device, according to the first peripheral device data, the second peripheral device data, and the host device data;
compares the calculated host device collision prediction time with the calculated other device collision prediction time; and
shortens a transmission interval of the host device data when the host device collision prediction time is shorter than a predetermined value and the host device collision prediction time is shorter than the other device collision prediction time; and
a transmission unit that transmits the host device data according to the transmission interval.

2. The communication device according to claim 1, wherein:
the control unit shortens the transmission interval of the host device data when a decrease amount per unit time of the host device collision prediction time is greater than a predetermined amount and the host device collision prediction time is shorter than the other device collision prediction time.

3. The communication device according to claim 1, wherein:
the first peripheral device is approaching the host device and the second peripheral device.

4. The communication device according to claim 1, wherein:
the second peripheral device is limited to a device disposed within a predetermined distance range from the host device.

5. The communication device according to claim 1, wherein:
the transmission unit transmits the host device data including information indicating that the transmission interval is shortened when shortening the transmission interval of the host device data; and
the control unit calculates the other device collision prediction time for only the second peripheral device, which transmits the second peripheral device data including the information indicating that the transmission interval is shortened, as a target object.

6. The communication device according to claim 1, wherein:
the control unit shortens the transmission interval of the host device data when it is determined that the second peripheral device shortens the transmission interval of the second peripheral device data instead of controlling based on the host device collision prediction time and the other device collision prediction time, in a case where the receiving unit does not receive the first peripheral device data from the first peripheral device.

7. The communication device according to claim 1, wherein:
the transmission unit transmits a flag indicating that the first peripheral device data is received, in addition to the host device data.

8. The communication device according to claim 6, wherein:
the transmission unit does not transmit a flag indicating that the first peripheral device data is received.

9. The communication device according to claim 6, wherein:
the control unit executes a processing only when the receiving unit receives a flag, indicating that the first peripheral device data is received, from the second peripheral device.

10. A communication terminal device comprising:
a receiving unit that receives first peripheral device data, which relates to a movement state of a first peripheral device, transmitted from the first peripheral device and second peripheral device data, which relates to a movement state of a second peripheral device, transmitted from the second peripheral device;
an acquiring unit that acquires host device data which relates to a movement state of the host device;
a control unit that:
calculates host device collision prediction time, which is predicted collision time between the first peripheral device and the host device, and other device collision prediction time, which is predicted collision time between the first peripheral device and the second peripheral device, according to the first peripheral device data, the second peripheral device data, and the host device data;
compares the calculated host device collision prediction time with the calculated other device collision prediction time; and shortens a transmission interval of the host device data when the host device collision prediction time is shorter than a predetermined value and the host device collision prediction time is shorter than the other device collision prediction time;
a transmission unit that transmits the host device data according to the transmission interval; and
an antenna that is connected to the receiving unit and the transmission unit.

11. A communication method comprising:
receiving first peripheral device data, which relates to a movement state of a first peripheral device, transmitted from the first peripheral device and second peripheral device data, which relates to a movement state of a second peripheral device, transmitted from the second peripheral device;
acquiring host device data which relates to a movement state of the host device;
calculating host device collision prediction time, which is predicted collision time between the first peripheral device and the host device, and other device collision prediction time, which is predicted collision time between the first peripheral device and the second peripheral device, according to the first peripheral device data, the second peripheral device data, and the host device data;
comparing the calculated host device collision prediction time with the calculated other device collision prediction time;
shortening a transmission interval of the host device data when the host device collision prediction time is shorter than a predetermined value and the host device collision prediction time is shorter than the other device collision prediction time; and
transmitting the host device data according to the transmission interval.

12. A non-transitory tangible computer readable medium comprising instructions for execution by a computer, the instructions comprising:
receiving first peripheral device data, which relates to a movement state of a first peripheral device, transmitted from the first peripheral device and second peripheral device data, which relates to a movement state of a second peripheral device, transmitted from the second peripheral device;
acquiring host device data which relates to a movement state of the host device;
calculating host device collision prediction time, which is predicted collision time between the first peripheral device and the host device, and other device collision prediction time, which is predicted collision time between the first peripheral device and the second peripheral device, according to the first peripheral device data, the second peripheral device data, and the host device data;
comparing the calculated host device collision prediction time with the calculated other device collision prediction time;
shortening a transmission interval of the host device data when the host device collision prediction time is shorter than a predetermined value and the host device collision prediction time is shorter than the other device collision prediction time; and
transmitting the host device data according to the transmission interval.

* * * * *